(12) United States Patent
Koyauchi et al.

(10) Patent No.: US 11,188,282 B2
(45) Date of Patent: Nov. 30, 2021

(54) PRINTING APPARATUS AND METHOD

(71) Applicant: SEIKO EPSON CORPORATION, Tokyo (JP)

(72) Inventors: Yasuo Koyauchi, Nagano (JP); Hozumi Seike, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/033,994

(22) Filed: Sep. 28, 2020

(65) Prior Publication Data

US 2021/0096796 A1 Apr. 1, 2021

(30) Foreign Application Priority Data

Sep. 30, 2019 (JP) .............................. JP2019-178878

(51) Int. Cl.
*G06F 3/12* (2006.01)
*H04N 1/00* (2006.01)

(52) U.S. Cl.
CPC .......... *G06F 3/1259* (2013.01); *G06F 3/1205* (2013.01); *G06F 3/1243* (2013.01); *H04N 1/0044* (2013.01); *H04N 1/00477* (2013.01)

(58) Field of Classification Search
CPC .... G06F 3/1259; G06F 3/1205; G06F 3/1243; G06F 3/1207; G06F 3/1229; G06F 3/1204; H04N 1/0044; H04N 1/00477
See application file for complete search history.

(56) References Cited

U.S. PATENT DOCUMENTS

| | | | | |
|---|---|---|---|---|
| 2007/0109586 A1* | 5/2007 | Yamada | ................ | G06F 3/121 358/1.14 |
| 2016/0034229 A1* | 2/2016 | Yamaguchi | .......... | H04N 1/0032 358/1.13 |
| 2020/0396344 A1* | 12/2020 | Wakabayashi | ..... | H04N 1/00307 |

FOREIGN PATENT DOCUMENTS

JP 2011-258075 A 12/2011

* cited by examiner

*Primary Examiner* — Iriana Cruz
(74) *Attorney, Agent, or Firm* — Global IP Counselors, LLP (57) ABSTRACT

A printing apparatus includes a display controller that causes a display unit to execute displaying, and a printing unit that executes printing based on a print job. When a plurality of copies are to be printed based on the print job, the display controller causes the display unit to display a first screen including an image to be printed before completion of the printing of a first copy and causes the display unit to display a second screen that does not include the image to be printed and includes information indicating a state of the printing apparatus after the completion of the printing of the first copy and before completion of the printing of all of the copies.

10 Claims, 5 Drawing Sheets

| E3 | 1/10 | Sample data.xxx | 2 min rem. | P3 ‖ PAUSE |

C3 — Start Time: 01 H 20 M
J3 — Color: Light   Size: M
D3 — WG: AUTO   4.5mm   Platen: P

FIG. 7

E4 — 002/010 Sample data.jpg
G4 / P4 — Light  Size: M
C4 — Timer: 01 H 20 M
A4: WH | BK | Y | M | C | CL
B4: (ink icons)
D4 — WG: AUTO   4.5mm   Platen: P

FIG. 8

PRINTING APPARATUS AND METHOD

The present application is based on, and claims priority from JP Application Serial Number 2019-178878, filed Sep. 30, 2019, the disclosure of which is hereby incorporated by reference herein in its entirety.

BACKGROUND

1. Technical Field

The present disclosure relates to a printing apparatus and a method.

2. Related Art

A technique for displaying printing progress information or the like on a display of a printing apparatus during continuous printing of the same data multiple times is known.

For example, an image processing device for displaying printing progress is known (refer to JP-A-2011-258075. Regarding layout images indicating layouts of images on printing sheets, the image processing device displays, in different manners, a completely printed layout image and an incompletely printed layout image.

However, displayed information of a printing apparatus of the related art is the same, regardless of which copy is being printed, and various information is presented and displayed. Therefore, a user takes time and effort to search for useful information to confirm information during a printing operation.

SUMMARY

A printing apparatus according to an aspect includes a display controller that causes a display unit to execute displaying, and a printing unit that executes printing based on a print job. When a plurality of copies are to be printed based on the print job, the display controller causes the display unit to display a first screen including an image to be printed before completion of the printing of a first copy and causes the display unit to display a second screen that does not include the image to be printed and includes information indicating a state of the printing apparatus after the completion of the printing of the first copy and before completion of the printing of all of the copies.

A printing apparatus according to another aspect includes a display controller that causes a display unit to execute displaying, and a printing unit that executes printing based on a print job. When a plurality of copies are to be printed based on the print job, the display controller causes the display unit to display a first screen including an image to be printed before completion of the printing of a first copy and causes the display unit to display a second screen that includes information indicating a state of the printing apparatus and an image to be printed and smaller than the image to be printed and included in the first screen after the completion of the printing of the first copy and before completion of the printing of all of the copies.

A method for producing printed objects of a plurality of copies according to still another aspect includes displaying a first screen including an image to be printed before completion of printing of a first copy, producing a printed object of the first copy, displaying a second screen that does not include the image to be printed and includes a state of a printing apparatus or that includes the information indicating the state of the printing apparatus and an image to be printed and smaller than the image to be printed and included in the first screen after completion of the production of the printed object of the first copy and before completion of production of printed objects of all of the copies, and producing printed objects of second and subsequent copies.

DESCRIPTION OF EXEMPLARY EMBODIMENTS

Hereinafter, an embodiment of the disclosure is described in detail with reference to the drawings.

Configuration of Printing Apparatus

Figure 1:
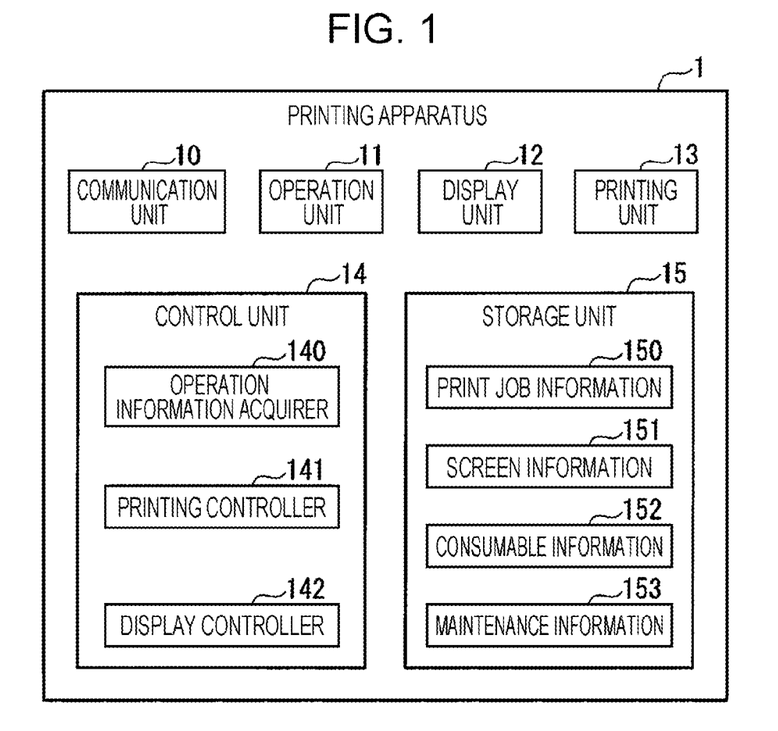
FIG. 1 is a diagram illustrating an example of a printing apparatus according to an embodiment.

FIG. 1 is a diagram illustrating an example of a printing apparatus 1 according to the embodiment. The printing apparatus 1 includes a communication unit 10, an operation unit 11, a display unit 12, a printing unit 13, a control unit 14, and a storage unit 15. The following description assumes that an error does not occur in the printing apparatus 1, unless otherwise specified. When an error occurs in the printing apparatus 1, it is sufficient that an error screen notification corresponding to the error be displayed and that known error handling be conducted. Screens described below are screens on which no error notification is displayed, unless otherwise specified.

The communication unit 10 transmits and receives data to and from an external device. The external device is, for example, a personal computer (PC), a smartphone, or the like. The data includes data of a print job.

The operation unit 11 receives an operation from a user of the printing apparatus 1.

The display unit 12 has a screen and executes display on the screen.

The printing unit 13 executes printing based on the print job.

The control unit 14 executes various types of control. The control unit 14 includes an operation information acquirer 140, a printing controller 141, and a display controller 142.

The operation information acquirer 140 acquires operation information that indicates the operation received by the operation unit 11.

The printing controller 141 controls the printing unit 13 and causes the printing unit 13 to execute the printing.

The display controller 142 controls the display unit 12 and causes the display unit 12 to display various types of information on the screen of the display unit 12.

The storage unit 15 stores various types of information. In the embodiment, the information stored in the storage unit 15 includes print job information 150, screen information 151, consumable information 152, and maintenance information 153, for example.

The print job information 150 indicates the print job. The print job includes print data and information of settings for the printing. In the embodiment, the print data includes data of an image to be printed. The information of the settings for the printing includes the number of copies to be printed, for example. In the embodiment, the number of print media on which the image is to be printed is referred to as the number of copies to be printed, regardless of the type of the print media on which the image is to be printed.

The screen information 151 is displayed on a screen displayed by the display unit 12.

The consumable information 152 is information on consumables. In the embodiment, the consumable information 152 includes amounts of ink remaining, amounts of liquid remaining in a discharged tank, amounts of a cloth wiper consumed, and the like, for example.

The maintenance information 153 is information on maintenance. In the embodiment, the maintenance information 153 includes information indicating a start time of automatic cleaning, for example.

Figure 2:
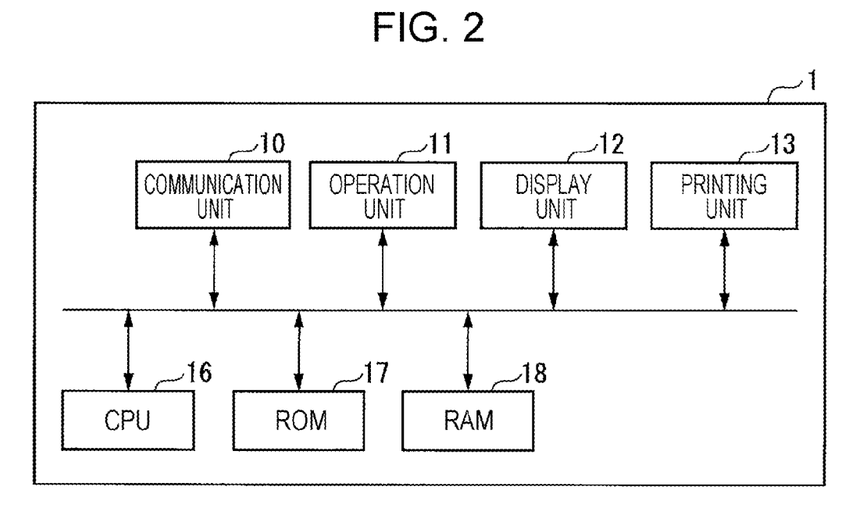
FIG. 2 is a diagram illustrating a hardware configuration of the printing apparatus according to the embodiment.

Next, a hardware configuration of the printing apparatus 1 is described with reference to FIG. 2. FIG. 2 is a diagram illustrating an example of the hardware configuration of the printing apparatus 1 according to the embodiment. The printing apparatus 1 is, for example, a direct-to-garment (DTG) printing apparatus. The printing apparatus 1 may be another printing apparatus, such as a printing apparatus for executing printing on a sheet as a print medium.

The printing apparatus 1 includes the communication unit 10, the operation unit 11, the display unit 12, the printing unit 13, a central processing unit (CPU) 16, a read-only memory (ROM) 17, and a random-access memory (RAM) 18.

The communication unit 10 has an interface function of enabling the printing apparatus 1 to communicate with an external device via a network.

The operation unit 11 has buttons corresponding to operations instructed by the user, for example. In the embodiment, the printing apparatus 1 has, as the buttons, at least a print button for causing the printing apparatus 1 to execute the printing and a stop button for stopping the printing.

The display unit 12 has a screen, such as a liquid crystal display screen or an organic electroluminescence (EL) display screen.

The operation unit 11 and the display unit 12 may be unified and configured as a touch panel. In this case, the print button and the stop button may be virtual buttons displayed on the touch panel.

The printing unit 13 prints, on a print medium, the image to be printed. For example, the printing unit 13 prints the image, which is to be printed, on a garment by depositing ink of colors, such as cyan, magenta, yellow, black, and white, directly onto the garment. In this case, the garment that is the print medium is a T-shirt or the like.

The CPU 16 reads a program from the ROM 17 and executes various types of control in accordance with the read program. The CPU 16 may include a plurality of internal storage locations, such as registers. The CPU 16 temporarily stores data from the ROM 17 in the internal storage and executes arithmetic processing based on the data. The CPU 16 outputs results of the arithmetic processing to the internal storage and outputs the results of the arithmetic processing from the internal storage to the RAM 18 or to an external storage medium. The CPU 16 corresponds to the control unit 14 illustrated in FIG. 1. A graphics processing unit (GPU), an application specific integrated circuit (ASIC), or the like may be used instead of the CPU 16 or may be used in collaboration with the CPU 16.

The ROM 17 is a main storage device storing various programs, data, parameters, and the like that are to be used by the CPU 16 to execute various types of calculation and control. The ROM 17 can hold stored details even in a state in which power is not supplied to the ROM 17.

The RAM 18 is a main storage device to be used as a working memory by the CPU 16. A program, data, and the like are written and deleted by the CPU 16 to and retrieved from the RAM 18. The RAM 18 may serve as internal storage, for example.

The ROM 17 and the RAM 18 correspond to the storage unit 15 illustrated in FIG. 1.

Screen Display Process of Printing Apparatus

A screen display process to be executed by the printing apparatus 1 to print a plurality of copies based on the print job is described below.

Figure 3:
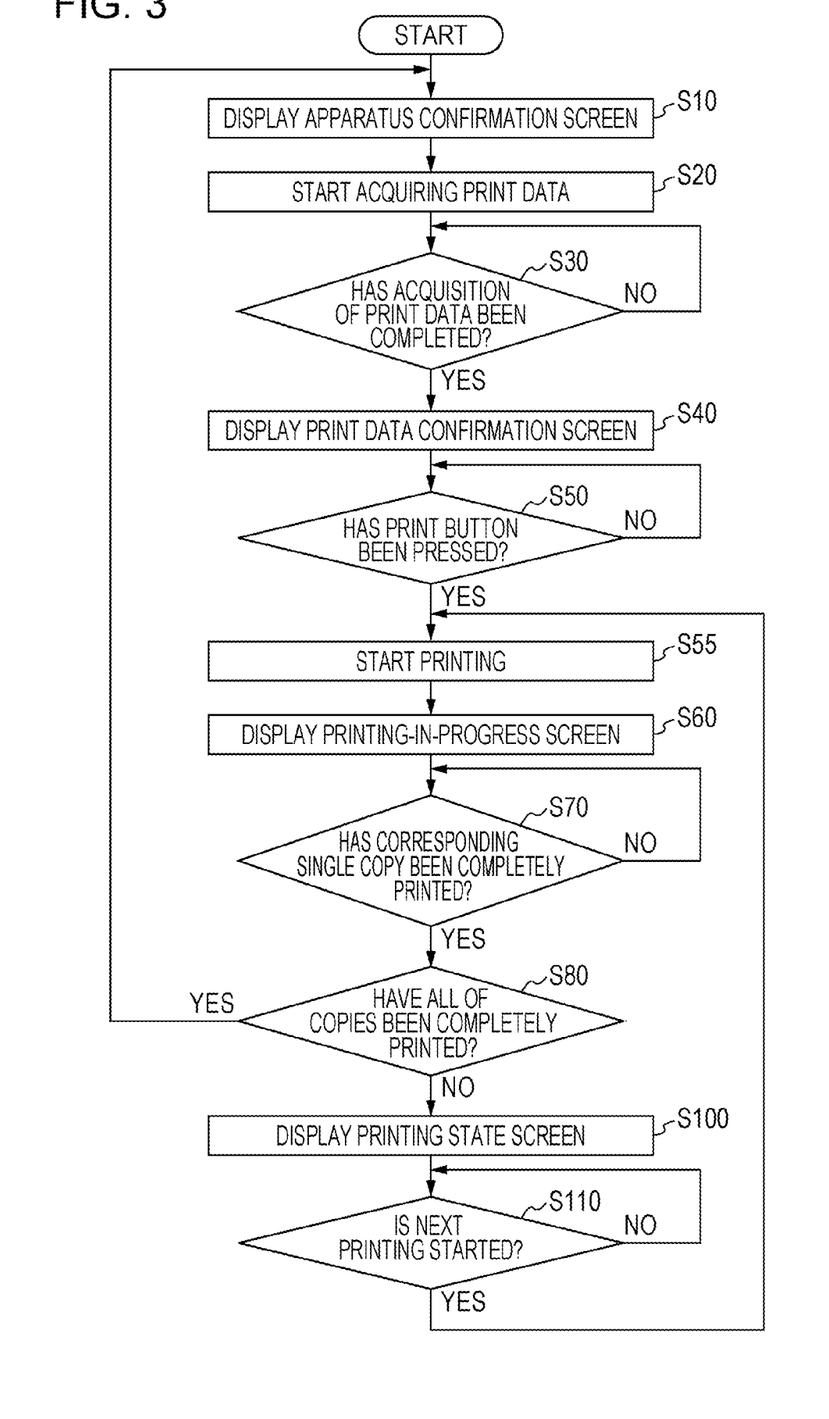
FIG. 3 is a diagram illustrating an example of a screen display process according to the embodiment.

FIG. 3 is a diagram illustrating an example of the screen display process according to the embodiment. The screen display process illustrated in FIG. 3 is started when the printing apparatus 1 is switched on and enters a standby state. When the user presses the stop button during the screen display process, a stop process is executed when necessary and the screen display process returns to step S10 in which the printing apparatus 1 is in an initial state.

Figure 4:
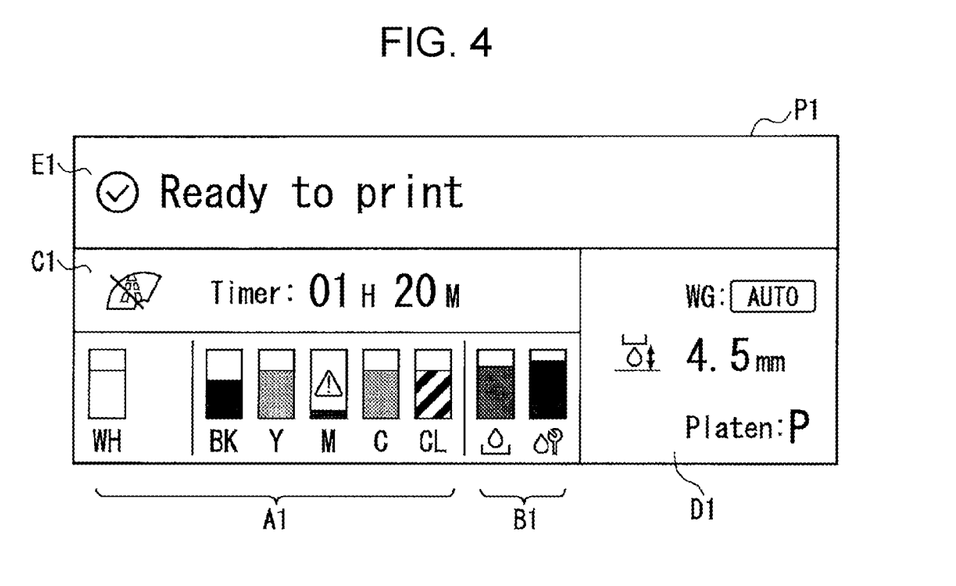
FIG. 4 is a diagram illustrating an example of a apparatus confirmation screen according to the embodiment.

FIG. 4 is a diagram illustrating an example of a apparatus confirmation screen P1 according to the embodiment.

Figure 5:
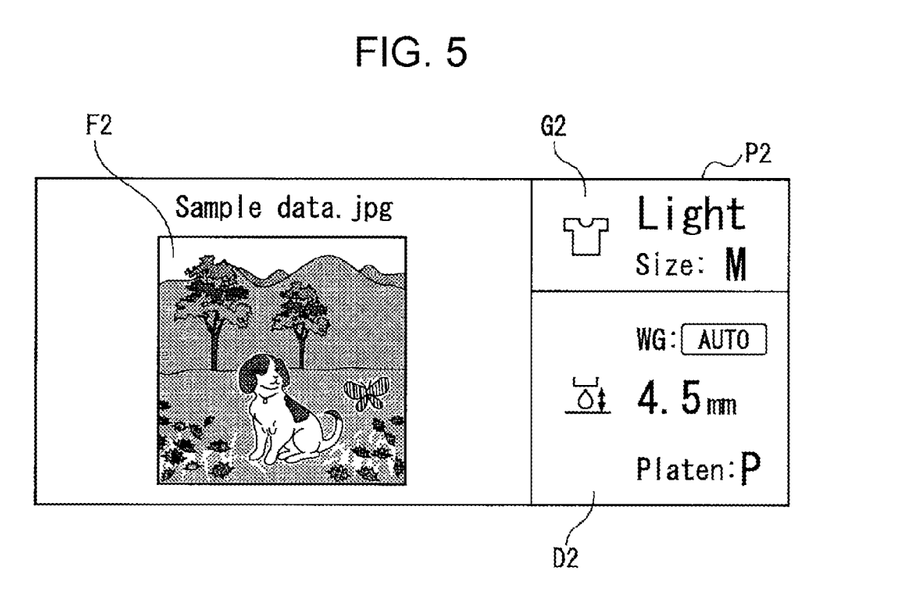
FIG. 5 is a diagram illustrating an example of a print data confirmation screen according to the embodiment.

FIG. 5 is a diagram illustrating an example of a print data confirmation screen P2 according to the embodiment.

Figure 6:
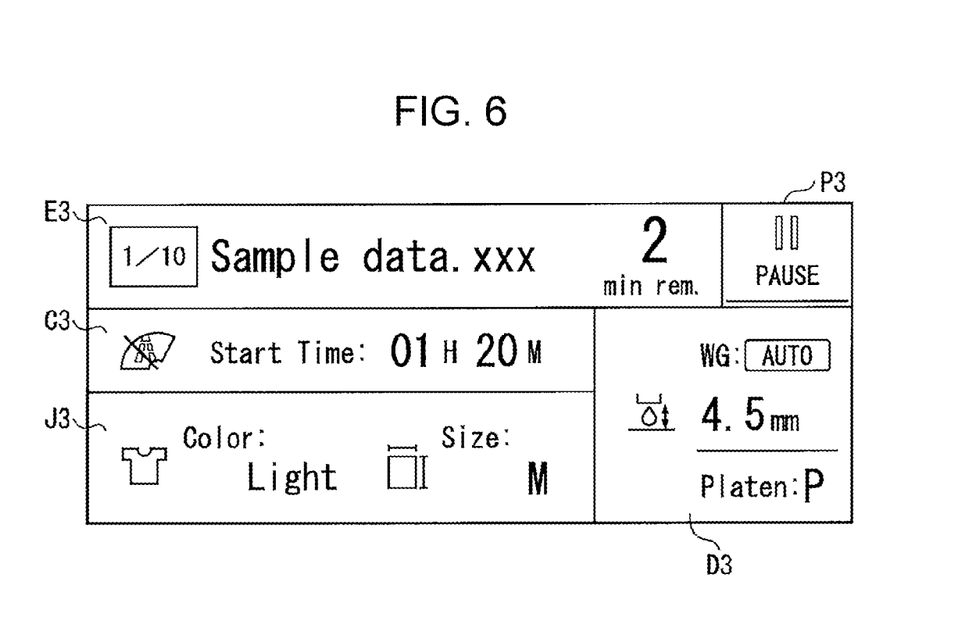
FIG. 6 is a diagram illustrating an example of a printing-in-progress screen according to the embodiment.

FIG. 6 is a diagram illustrating an example of a printing-in-progress screen P3 according to the embodiment.

Figure 7:
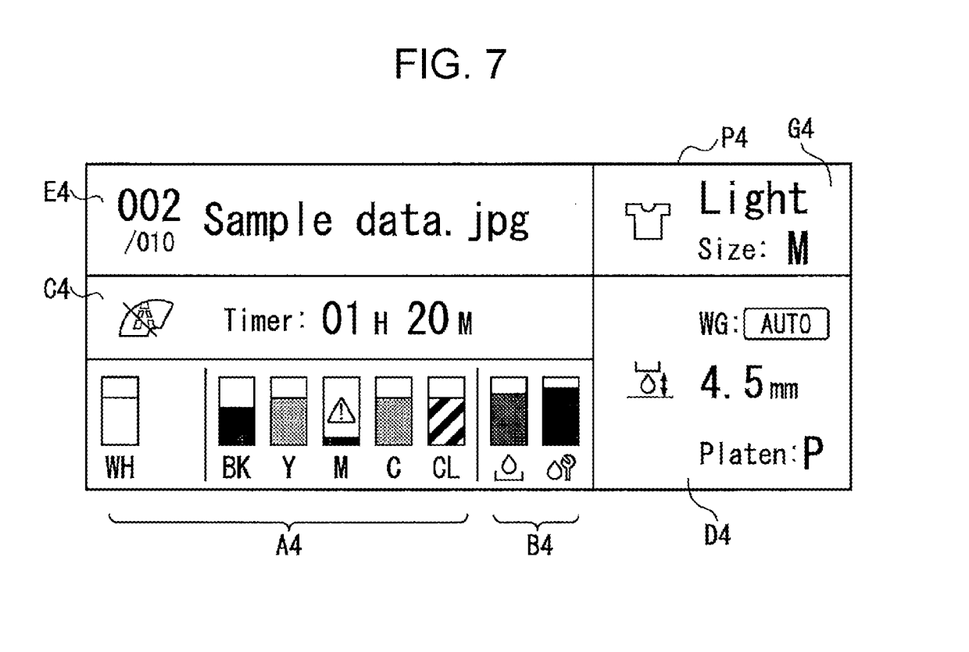
FIG. 7 is a diagram illustrating an example of a printing state screen according to the embodiment.

FIG. 7 is a diagram illustrating an example of a printing state screen P4 according to the embodiment.

In step S10, the display controller 142 causes the display unit 12 to display the apparatus confirmation screen P1. When the printing apparatus 1 does not have the print job, the display controller 142 causes the display unit 12 to display the apparatus confirmation screen P1. The apparatus confirmation screen P1 does not include a print preview indicating an image to be printed and includes information indicating a state of the printing apparatus 1. The apparatus confirmation screen P1 also includes the information of the consumables. The apparatus confirmation screen P1 is an example of a fifth screen.

Specifically, when the printing apparatus 1 does not have the print job, the display controller 142 causes the display unit 12 to display the fifth screen that does not include an image to be printed and includes the information indicating the state of the printing apparatus 1.

The apparatus confirmation screen P1 is described with reference to FIG. 4. The apparatus confirmation screen P1 includes, for example, ink information A1, discharged liquid tank information B1, cleaning start time information C1, distance information D1, and state information E1.

The ink information A1 indicates amounts of remaining ink. The ink information A1 has gauges to indicate the amounts of the remaining ink.

The discharged liquid tank information B1 indicates an amount of a liquid remaining in a discharged tank and an amount of a cloth wiper consumed. The discharged liquid tank information B1 has a gauge to indicate the amount of the liquid remaining in the discharged tank and has a gauge to indicate the amount of the cloth wiper consumed. The ink information A1 and the discharged liquid tank information B1 are an example of information of a consumable.

The display controller 142 displays the ink information A1 and the discharged liquid tank information B1 based on the consumable information 152.

The cleaning start time information C1 indicates a start time of the automatic cleaning. The automatic cleaning is executed during downtime when the printing apparatus 1 is disabled from executing printing. The display controller 142 displays the cleaning start time information C1 based on the maintenance information 153.

The distance information D1 indicates a distance between a head of the printing unit 13 and the print medium and a distance corresponding to a height of a platen of the printing unit 13. In the example illustrated in FIG. 4, the distance between the head of the printing unit 13 and the print medium is indicated by a value, which is "4.5 mm". The height of the platen of the printing unit 13 is indicated by a stepped value, as indicated by "Platen: P". In the embodiment, the platen is a table on which the print medium is set.

The distance between the head and the print medium is automatically set by the printing controller 141 or manually set by the user. In the example illustrated in FIG. 4, the distance between the head and the print medium is automatically set, as indicated by "WG: AUTO".

The state information E1 indicates the state of the printing apparatus 1 before the execution of the printing. In the example illustrated in FIG. 4, the state information E1 is indicated by the text "Ready to print", which indicates that the printing can be executed. The state information E1 is an example of information indicating the state of the printing apparatus 1.

Returning to FIG. 3, the description of the screen display process is continued.

In step S20, the printing controller 141 starts acquiring the print data. The printing controller 141 acquires the data of the print job via the communication unit 10 from an external device, such as a PC. The printing controller 141 extracts the print data from the acquired data of the print job.

In step S30, the printing controller 141 determines whether the acquisition of the print data has been completed. When the printing controller 141 determines that the acquisition of the print data has been completed (YES in step S30), a process of step S40 is executed. On the other hand, when the printing controller 141 determines that the acquisition of the print data has not been completed (NO in step S30), the printing controller 141 executes the process of step S30 again.

In step S40, the display controller 142 causes the display unit 12 to display the print data confirmation screen P2. The print data confirmation screen P2 does not include the information of the consumables and includes the image to be printed. The print data confirmation screen P2 is an example of a first screen.

Step S40 is executed before printing of a first copy is completed. Specifically, when the plurality of copies are to be printed based on the print job, the display unit 12 displays the first screen including the image to be printed before the completion of the printing of the first copy.

The print data confirmation screen P2 is described with reference to FIG. 5. The print data confirmation screen P2 includes a print preview F2, distance information D2, and print medium information G2 as an example.

The print preview F2 is a displayed image indicating the expected completed object resulting from the printing. The display controller 142 causes the display unit 12 to display the print preview F2 based on the print data. The user views the print preview to confirm the target to be printed and determines whether to perform the printing. The print preview F2 is an example of the image to be printed.

The distance information D2 is the same as or similar to the foregoing distance information D1 illustrated in FIG. 4.

The print medium information G2 is information on the print medium. For example, the print medium information G2 indicates the type of a color of a T-shirt that is the print medium and the size of the table on which the T-shirt is set. The size is indicated by, for example, "S" indicating small, "M" indicating medium, "L" indicating large, or the like, for example. The type of the color of the T-shirt is "dark" indicating a dark color, "light" indicating a light color, or the like, for example. In the example illustrated in FIG. 5, "light" indicates that the type of the color of the T-shirt is a light color and "M" indicates the size of the table.

Returning to FIG. 3, the description of the screen display process is continued.

In step S50, the printing controller 141 determines whether the print button has been pressed by the user. When the printing controller 141 determines that the print button has been pressed (YES in step S50), the printing controller 141 executes a process of step S55. On the other hand, when the printing controller 141 determines that the print button has not been pressed (NO in step S50), the printing controller 141 executes the process of step S50 again.

In step S55, the printing controller 141 causes the printing unit 13 to start the printing. After step S55, a process of step S60 is executed. The printing unit 13 is controlled by the printing controller 141 and starts the printing.

In step S60, the display controller 142 causes the display unit 12 to display the printing-in-progress screen P3. The printing-in-progress screen P3 is an example of a third screen.

In this case, step S60 is executed for the first time in the printing of the first copy. Specifically, when the plurality of copies are to be printed based on the print job, the display unit 12 displays the third screen during the printing of the first copy.

In the embodiment, in the printing of second and subsequent copies, step S60 is executed after step S110.

The printing-in-progress screen P3 is described with reference to FIG. 6. The printing-in-progress screen P3 includes cleaning start time information C3, distance information D3, state information E3, and printing target information J3.

The cleaning start time information C3 and the distance information D3 are the same as or similar to the cleaning start time information C1 and the distance information D1 that are described above and illustrated in FIG. 4.

The state information E3 indicates the state of the printing apparatus 1 when the printing apparatus 1 executes the printing. The state information E3 includes information indicating the copy being printed among the plurality of copies, information indicating the name of the print job, and information indicating a remaining time until the printing is completed. FIG. 6 illustrates an example in which "1/10" as the state information E3 indicates that the number of copies to be printed is 10 and that the first copy is being printed. FIG. 6 illustrates the example in which "Sample data.xxx" as the state information E3 indicates the name of the print job. FIG. 6 illustrates the example in which "2 min rem." as the state information E3 indicates a remaining time until the printing is completed.

In the example illustrated in FIG. 6, the state information E3 includes an operation button for pausing the printing.

Returning to FIG. 3, the description of the screen display process is continued.

In step S70, the printing controller 141 determines whether the printing of the corresponding single copy has been completed. When the printing controller 141 determines that the printing of the corresponding single copy has been completed (YES in step S70), the printing controller 141 executes a process of step S80. On the other hand, when the printing controller 141 determines that the printing of the corresponding single copy has not been completed (NO in step 370), the printing controller 141 executes the process of step S70 again. The corresponding single copy is the first copy in step S70 executed for the first time and is the second or subsequent copy in step S70 executed thereafter.

In step S80, the printing controller 141 determines whether the printing of all of the copies has been completed. When the printing controller 141 determines that the printing of all of the copies has been completed (YES in step S80), the printing controller 141 causes the process to return to the process of step S10. On the other hand, when the printing controller 141 determines that the printing of all of the copies has not been completed (NO in step S80), the printing controller 141 starts printing the next single copy and a process of step 100 is executed. The next single copy is the second copy following the first copy, for example, and the same applies to subsequent copies.

In step S100, the display controller 142 causes the display unit 12 to display the printing state screen P4. The printing state screen P4 does not include the print preview and includes the information indicating the state of the printing apparatus 1. The printing state screen P4 includes the information included in the apparatus confirmation screen P1 and information of the print medium. The information included in the apparatus confirmation screen P1 includes the information of the consumables that is the ink information A1, the discharged liquid tank information B1, and the like, as described above. Therefore, the printing state screen P4 includes the information of the consumables. The printing state screen P4 is an example of a second screen.

Step S100 is executed when no printing is executed after the completion of the printing of the first copy and before the completion of the printing of all of the copies. Specifically, the display unit 12 displays the second screen when no printing is executed after the completion of the printing of the first copy and before the completion of the printing of all of the copies.

The printing state screen P4 is described below with reference to FIG. 7. The printing state screen P4 includes ink information A4, discharged liquid tank information B4, cleaning start time information C4, distance information D4, state information E4, and print medium information G4.

The ink information A4, the discharged liquid tank information B4, the cleaning start time information C4, and the distance information D4 are the same as or similar to the ink information A1, the discharged liquid tank information B1, the cleaning start time information C1, and the distance information D1 that are illustrated in FIG. 1. The print medium information G4 is the same as or similar to the print medium information G2 illustrated in FIG. 5.

The state information E4 includes the information indicating the copy being printed among the plurality of copies and the information indicating the name of the print job. The state information E4 is an example of the information indicating the state of the printing apparatus 1.

Returning to FIG. 3, the description of the screen display process is continued.

In step S110, the printing controller 141 determines whether to start printing the next copy after the completion of the printing of the corresponding single copy. When the printing controller 141 determines that the printing is to be started (YES in step S110), the printing controller 141 executes the process of step S55, and the process of step S60 is executed. As described above, in step S60, the display controller 142 causes the display unit 12 to display the printing-in-progress screen P3. Specifically, when the plurality of copies are to be printed based on the print job, the display unit 12 displays the printing-in-progress screen P3 during the printing of second and subsequent copies. The printing-in-progress screen P3 that is displayed by the display unit 12 during the printing of the second and subsequent copies is an example of a fourth screen.

On the other hand, when the printing controller 141 determines that printing of the corresponding copy has not yet been completed (NO in step S110), the printing controller 141 executes the process of step S110 again.

In this case, the printing controller 141 can use a plurality of methods to determine whether to start the subsequent printing. For example, the printing controller 141 may determine that the subsequent printing is to be started when the user presses the print button. The printing controller 141 may use a sensor to detect that the subsequent print medium has been set, and determine that the subsequent printing is to be started.

In step S60 after the execution of step S110, the display controller 142 updates, in accordance with the copy being printed, information that is indicated in the state information E3 included in the printing-in-progress screen P3 displayed by the display unit 12 in the previous step S60 and indicates the copy being printed among the plurality of copies. Specifically, the configurations of the cleaning start time information C3, the distance information D3, the state information E3, and the printing target information J3 on the printing-in-progress screen P3 displayed by the display unit 12 during the printing of the first copy are the same as those of the cleaning start time information C3, the distance information D3, the state information E3, and the printing target information J3 on the printing-in-progress screen P3 displayed by the display unit 12 during the printing of the second and subsequent copies. The configurations indicate types and arrangement of items displayed on the screens. In other words, the configuration of the third screen is the same as that of the fourth screen.

In the screen display process according to the embodiment, the display controller 142 uses, as a trigger, an action performed in a user workflow and the completion of the printing to switch an image displayed by the display unit 12 to an image that is to be displayed by the display unit 12. The action performed in the user workflow includes an action of causing the printing apparatus 1 to acquire the print data and pressing the print button. The action of causing the printing apparatus 1 to acquire the print data may be an action of starting the printing, for example.

The example in which, in the screen display process according to the embodiment, the display controller 142 uses, as the trigger, the action performed in the user workflow and the completion of the printing to switch the image displayed by the display unit 12 to the image that is to be displayed by the display unit 12 is described. The display controller 142, however, is not limited to this. For example, when the operation unit 11 receives a user operation for switching an image displayed by the display unit 12 to an image that is to be displayed by the display unit 12, the display controller 142 may switch the image displayed by the display unit 12 to the image that is to be displayed by the display unit 12.

When the display unit 12 displays the print data confirmation screen P2 and the operation unit 11 receives a user operation of switching an image displayed by the display unit 12 to an image that is to be displayed by the display unit 12, the display controller 142 may switch an image that is displayed by the display unit 12 from the print data confirmation screen P2 displayed by the display unit 12 to the print state screen P4 that is to be displayed by the display unit 12.

As described with respect to steps S10 and S60, the embodiment describes the example in which, when the plurality of copies are to be printed based on the print job, the display unit 12 displays the first screen before the start of the printing of the first copy and displays the third screen during the printing of the first copy. The printing, however, is not limited to this. When the plurality of copies are to be printed based on the print job, the display unit 12 may display the first screen before the start of the printing of the first copy and is not limited to displaying the third screen during the printing of the first copy.

For example, when the plurality of copies are to be printed based on the print job, the display unit 12 may display the first screen before the start of the printing of the first copy and display the first screen during the printing of the first copy. In the example of the screen display process illustrated in FIG. 3, in step S60 executed for the first time, the display controller 142 may cause the display unit 12 to display the print data confirmation screen P2 instead of the printing-in-progress screen P3. Specifically, in this case, in step S60, the display unit 12 may continuously display the print data confirmation screen P2 displayed in step S40.

As described with respect to the process of step S60 that is executed after the foregoing process of step S110, the embodiment describes the example in which the display unit 12 displays the second screen in the time period when no printing is executed after the completion of the printing of the first copy and before the completion the printing of all of the copies. The display unit 12, however, is not limited to this. In a time period when the printing is executed after the completion of the printing of the first copy and before the completion of the printing of all of the copies, the display unit 12 may display the second screen.

For example, in the time period when the printing is executed after the completion of the printing of the first copy and before the completion of the printing of all of the copies, the display unit 12 may display the second screen, instead of the fourth screen. In the example of the screen display process illustrated in FIG. 3, in step S100, the display controller 142 may cause the display unit 12 to display the second screen, instead of the fourth screen.

As described above, when the plurality of copies are to be printed based on the print job, the display unit 12 displays the second screen that does not include the image to be printed and includes the information indicating the state of the printing apparatus 1 after the completion of the printing of the first copy and before the completion of the printing of all of the copies.

Although the embodiment describes the example in which the configuration of the third screen is the same as that of the fourth screen, the embodiment is not limited to this. The configuration of the third screen may be different from that of the fourth screen. For example, the configuration of the printing-in-progress screen P3 displayed by the display unit 12 during the printing of the first copy may be different from the configuration of the printing-in-progress screen P3 displayed by the display unit 12 during the printing of the second and subsequent copies.

The state information E3 included in the printing-in-progress screen P3 displayed by the display unit 12 during the printing of the first copy is not limited to including the information indicating the copy being printed among the plurality of copies.

The embodiment describes the case where the plurality of copies are printed by the printing apparatus 1. However, for example, when a single copy is to be printed, the same process as that to be executed to print the first copy may be executed in the same manner as described in the embodiment.

As described above, the printing apparatus 1 according to the embodiment includes the display controller 142 that causes the display unit 12 to execute the display and the printing unit 13 that executes the printing based on the print job.

When the plurality of copies are to be printed based on the print job, the display controller 142 causes the display unit 12 to display the first screen (print data confirmation screen P2 in the embodiment) and causes the display unit 12 to display the second screen (printing state screen P4 in the embodiment) after the completion of the printing of the first copy and before the completion of the printing of all of the copies. The first screen includes the image (print preview F2 in the embodiment) to be printed. The second screen does not include the image (print preview F2 in the embodiment) to be printed. The information (distance information D2 in the embodiment) displayed on the first screen and indicating the state of the printing apparatus 1 excludes at least some (the ink information A4, the discharged liquid tank information B4, and the cleaning start time information C4 in the embodiment) of the information (the ink information A4, the discharged liquid tank information B4, the cleaning start time information C4, and the distance information D4 in the embodiment) displayed on the second screen and indicating the state of the printing apparatus 1. The first screen and the second screen commonly include the partial information (the print medium information G2 and the print medium information G4 in the embodiment).

According to this configuration, in the printing apparatus 1 according to the embodiment, the user can confirm the image to be printed before the completion of the printing of the first copy and confirm the state of the printing apparatus 1 without the image to be printed after the completion of the printing of the first copy and before the completion of the printing of all of the copies. It is, therefore, possible to reduce user burden in searching for information useful in a work procedure for causing the printing apparatus 1 to execute the printing. Since it is possible to reduce the effort in searching for the information in the user work procedure in the printing apparatus 1 according to the embodiment, the printing apparatus 1 improves productivity. Especially, the display unit 12 is small. Thus, when all information is displayed, characters and the like are too small, and it is difficult to confirm information, the improvement of the productivity can be expected.

For example, to confirm whether data to be printed is correct in the printing of the first copy, thumb nail image information of the data is required for the DTG printing apparatus, and consumable information, information of a start time of the automatic cleaning, and the like that are useful to efficiently continue the printing are required for the DTG printing apparatus in the printing of the second and subsequent copies.

When the same data is to be continuously printed a plurality of times, useful information varies depending on the copy being printed. The printing apparatus 1 according to the embodiment can display useful information when necessary.

The printing apparatus 1 according to the embodiment displays the first screen including a thumbnail to be printed to confirm whether the data to be printed is correct before the completion of the printing of the first copy. On the other hand, the printing apparatus 1 according to the embodiment displays the second screen including the consumable information useful to efficiently continue to execute the printing, information of the start time of the automatic cleaning, and the like in the printing of the second and subsequent copies. Specifically, the printing apparatus 1 according to the embodiment can reduce information unnecessary for the user from a screen displayed for the workflow and can display information useful for the user. In this manner, user burden in searching for information from the work flow can be reduced, compared to the case where the same screen is continuously displayed in the work flow.

In the printing apparatus 1 according to the embodiment, when the plurality of copies are to be printed based on the print job, the display controller 142 causes the display unit 12 to display the first screen (print data confirmation screen P2 in the embodiment) before the start of the printing of the first copy, causes the display unit 12 to display the third screen (printing-in-progress screen P3 in the embodiment) during the printing of the first copy, causes the display unit 12 to display the second screen (printing state screen P4 in the embodiment) in a time period when the printing is not executed after the completion of the printing of the first copy and before the completion of the printing of all of the copies, and causes the display unit 12 to display the fourth screen (printing-in-progress screen P3 in the printing of the second and subsequent copies in the embodiment) during the printing of the second and subsequent copies.

According to this configuration, in the printing apparatus 1 according to the embodiment, since the third screen or the fourth screen is displayed during the printing, it is possible to display information of the third or fourth screen during the printing while reducing user burden in searching for information in the work procedure for causing the printing apparatus 1 to execute the printing.

The configuration of the third screen (printing-in-progress screen P3 in the embodiment) and the configuration of the fourth screen (printing-in-progress screen P3 in the printing of the second and subsequent copies in the embodiment) are the same in the printing apparatus 1 according to the embodiment but is not limited to being the same.

According to this configuration, in the printing apparatus 1 according to the embodiment, since the screen with the same configuration is displayed, regardless of the copy being printed among the plurality of copies, it is possible to reduce user burden in searching for information from the screen being printed.

When the printing apparatus 1 according to the embodiment does not have the print job, the display controller 142 causes the display unit 12 to display the fifth screen (apparatus confirmation screen P1 in the embodiment) that does not include the image (print preview F2 in the embodiment) to be printed and includes the information (state information E1 in the embodiment) indicating the state of the printing apparatus 1.

According to this configuration, in the printing apparatus 1 according to the embodiment, the user can confirm the information that does not include the image to be printed and indicates the state of the printing apparatus 1 before the start of the printing, it is possible to reduce user burden in searching for the information indicating the state of the printing apparatus 1 before the start of the printing.

In the printing apparatus 1 according to the embodiment, the second screen (printing state screen P4 in the embodiment) includes the information included in the fifth screen (apparatus confirmation screen P1 in the embodiment) and information of a print medium.

According to this configuration, in the printing apparatus 1 according to the embodiment, since the user can confirm the information of the print medium, it is possible to reduce user burden in searching for the information of the print medium during the printing.

In the printing apparatus 1 according to the embodiment, the first screen (print data confirmation screen P2 in the embodiment) does not include the information of the consumables, and the second screen (printing state information P4 in the embodiment) and the fifth screen (apparatus confirmation screen P1 in the embodiment) include the information (ink information A1 and discharged liquid tank information B1 in the embodiment) of the consumables.

According to this configuration, in the printing apparatus 1 according to the embodiment, when a consumable is insufficient before the completion of the printing of the first copy, an error is displayed. Therefore, when the error is not displayed, the first copy can be printed and thus information of the consumable is not displayed. When the printing apparatus 1 does not have the print job or after the printing of the first copy is completed and before the printing is completed, the information of the consumable is displayed. It is, therefore, possible to reduce user burden in searching for the information of the consumable when the user needs the information of the consumable.

In the embodiment, it is possible to provide a method for producing printing objects of the plurality of copies by the printing apparatus 1.

Specifically, the method for producing the printed objects of the plurality of copies includes displaying the first screen including the image to be printed before the completion of the printing of the first copy, displaying the second screen that does not include the image to be printed and includes the state of the printing apparatus or that includes the image to be printed and smaller than the image included in the first screen and to be printed and information indicating the state of the printing apparatus after the completion of the production of a printed object of the first copy and before the completion of the production of the printed objects of all of the copies, and producing the printed objects of the second and subsequent copies.

According to this configuration, in the method according to the embodiment, the user can confirm the image to be printed before the completion of the printing of the first copy and can confirm the state of the printing apparatus after the completion of the printing of the first copy and before the completion of the printing of all of the copies. It is, therefore, possible to reduce user burden in searching for information useful for the work procedure for causing the printing apparatus 1 to execute the printing. In the method according to the embodiment, it is possible to reduce an effort in searching for information in the user's work procedure. Therefore, the method according to the embodiment improves the productivity.

Modification

Figure 8:
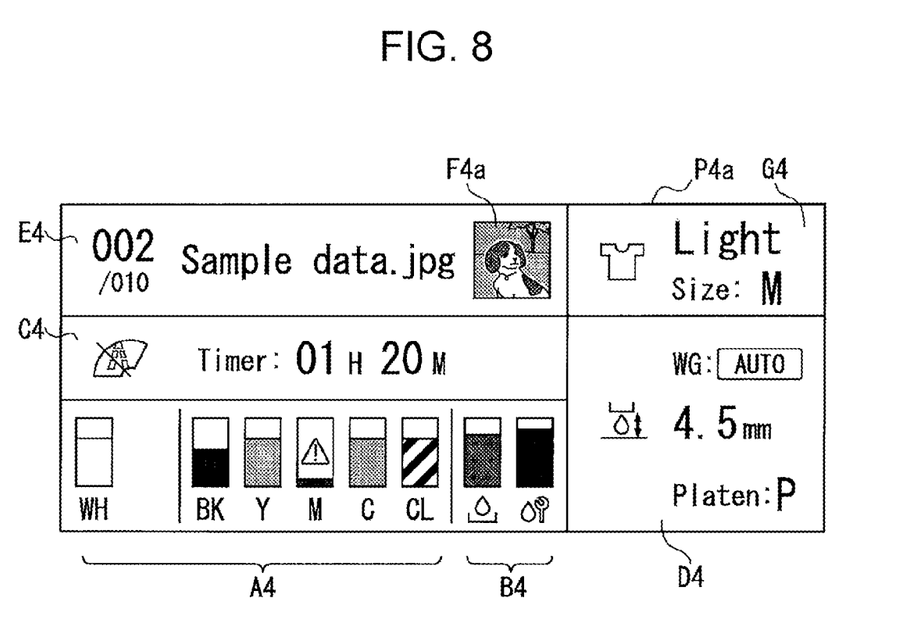
FIG. 8 is a diagram illustrating an example of a printing state screen according to a modification.

A modification of the foregoing embodiment is described below with reference to FIG. 8. FIG. 8 is a diagram illustrating an example of a printing state screen 4a according to the modification. The printing state screen P4a includes a print preview F4a, as well as the ink information A4, the discharged liquid tank information B4, the cleaning start time information C4, the distance information D4, the state information E4, and the print medium information G4. The print preview F4a is smaller than the print preview F2 included in the print data confirmation screen P2. The printing state screen 4a is an example of the second screen that includes the state of the printing apparatus 1 and the image to be printed and smaller than the image included in the first screen and to be printed.

Therefore, when the plurality of copies are to be printed based on the print job, the display controller 142 causes the display unit 12 to display the print data confirmation screen P2 including the print preview F2 before the completion of the printing of the first copy and causes the display unit 12 to display the second screen including the information indicating the state of the printing apparatus 1 and the print preview F4a smaller than the print preview F2 included in the print data confirmation screen P2 after the completion of the printing of the first copy and before the completion of the printing of all of the copies.

In the printing apparatus 1 according to the modification, when the plurality of copies are to be printed based on the print job, the display controller 142 causes the display unit 12 to display the first screen including the image to be printed before the completion of the printing of the first copy and causes the display unit 12 to display the second screen (printing state screen P4a in the modification) including the image (print preview F4a in the modification) to be printed and smaller than the image (print preview F2 in the modification) included in the first screen (print data confirmation screen P2 in the modification) and to be printed and the information (state information E4 in the modification) indicating the state of the printing apparatus 1 after the completion of the printing of the first copy and before the completion of the printing of all of the copies.

According to this configuration, in the printing apparatus 1 according to the modification, the user can confirm the image to be printed before the completion of the printing of the first copy and confirm the state of the printing apparatus and the image to be printed and smaller than the image included in the first screen and to be printed after the completion of the printing of the first copy and before the completion of the printing of all of the copies. It is, therefore, possible to reduce user burden in confirming the state of the printing apparatus and the image to be printed after the completion of the printing of the first copy and before the completion of the printing of all of the copies.

Although the foregoing embodiment describes the example in which the display controller 142 causes the display unit 12 to display the first screen, the second screen, the third screen, the fourth screen, and the fifth screen, the embodiment is not limited to this. For example, the display controller 142 may cause an apparatus other than the printing apparatus 1 to display the first screen, the second screen, the third screen, the fourth screen, and the fifth screen. For example, the apparatus may be a display device.

For example, the display controller 142 may output the information indicating the first screen, the second screen, the third screen, the fourth screen, and the fifth screen to a PC via the communication unit 10 and cause a display of the PC to display the first screen, the second screen, the third screen, the fourth screen, and the fifth screen.

A portion of the printing apparatus 1 according to the foregoing embodiment may be achieved by a computer. For example, the operation information acquirer 140, the printing controller 141, and the display controller 142 may be achieved by the computer. In this case, the operation information acquirer 140, the printing controller 141, and the display controller 142 may be achieved by storing, in a computer-readable recording medium, a program for achieving a function of controlling the operation information acquirer 140, the printing controller 141, and the display controller 142, reading the program stored in the recording medium into a computer system, and executing the program. The "computer system" is a computer system included in the printing apparatus 1 and includes an OS and hardware, such as a peripheral device. The "computer-readable recording medium" is a portable medium, such as a flexible disk, a magneto-optical disc, a ROM, or a CD-ROM, or a storage device, such as a hard disk included in the computer system. The "computer-readable recording medium" may include a medium that dynamically holds the program for a short time period and is a network, such as the Internet, a communication line, such as a phone line, or the like and via which the program is transmitted. The "computer-readable recording medium" may include a medium that holds the program for a short time period and is a volatile memory included in a computer system serving as a server or a client in the foregoing case. The foregoing program may be configured to achieve a portion of the foregoing function. The program may be achieved by combining the function with the program stored in the computer system.

A portion of the printing apparatus 1 according to the foregoing embodiment or the entire printing apparatus 1 may be achieved as an integrated circuit, such as a large scale integration (LSI). The functional blocks of the printing apparatus 1 may be individual processors, or some of the functional blocks or all of the functional blocks may be integrated into a processor. The integrated circuit is not limited to the LSI and may be achieved as a dedicated circuit or a general-purpose processor. When a technique for an integrated circuit appears instead of the LSI due to the progress of semiconductor techniques, the integrated circuit based on the technique may be used.

A plurality of components may be achieved as a single component, and a single component may be achieved as a plurality of components.

A portion of the printing apparatus 1 according to the foregoing embodiment may be installed in another apparatus. For example, the display controller 142 may control a projector coupled to the printing apparatus 1 via a network, thereby causing the projector to display the first screen, the second screen, the third screen, the fourth screen, and the fifth screen.

As a method for the printing, other printing, such as laser printing or sublimation printing, may be used, instead of the ink jet printing.

Although the embodiment of the disclosure is described above in detail with reference to the drawings, the specific configurations are not limited to the foregoing configurations and can be variously designed and changed without departing from the gist of the disclosure.

What is claimed is:

1. A printing apparatus comprising:
   a display controller that causes a display unit to execute displaying; and
   a printing unit that executes printing based on a print job, wherein
   when a plurality of copies are to be printed based on a single print job, the display controller causes the display unit to display, to a user, a first screen including an image to be printed and a first information before completion of the printing of a first copy and causes the display unit to display, to the user, a second screen that does not include the image to be printed and includes a second information after the completion of the printing of the first copy and before completion of the printing of all of the copies, each of the first information and the second information indicates at least a part of information regarding the single print job and a state of the printing apparatus, and the second information is different from the first information, and the display controller causes the display unit to display each of the first screen and the second screen in a process flow of printing the single print job.

2. The printing apparatus according to claim 1, wherein when the plurality of copies are to be printed based on the single print job, the display controller causes the display unit to display the first screen before start of the printing of the first copy, causes the display unit to display a third screen during the printing of the first copy, causes the display unit to display the second screen in a time period when the printing is not executed after the completion of the printing of the first copy and before the completion of the printing of all of the copies, and causes the display unit to display a fourth screen during the printing of second and subsequent copies, the third screen and the fourth screen display, to the user, a third information and a fourth information, respectively, each of the third information and the fourth information indicates at least a part of the information regarding the single print job and the state of the printing apparatus, and the third information and the fourth information are different from the first information and the second information, the display controller causes the display unit to display each of the first screen, the second screen, the third screen, and the fourth screen in the process flow of printing the single print job.

3. The printing apparatus according to claim 2, wherein the third screen has a configuration identical with a configuration of the fourth screen.

4. The printing apparatus according to claim 1, wherein when the printing apparatus does not have the print job, the display controller causes the display unit to display a fifth screen that does not include the image to be printed and includes the information indicating the state of the printing apparatus.

5. The printing apparatus according to claim 4, wherein the second screen includes the information included in the fifth screen and information of a print medium.

6. The printing apparatus according to claim 4, wherein the first screen does not include information of a consumable, and the second screen and the fifth screen include the information of the consumable.

7. The printing apparatus according to claim 1, wherein the first screen does not include information of a consumable, the second screen includes the information of the consumable, and the information of the consumable contains discharged liquid tank information and ink information which indicates amount of remaining ink.

8. The printing apparatus according to claim 1, wherein the second screen includes discharged liquid tank information, cleaning start time information, distance information on the printing unit, and ink information indicating amount of remaining ink.

9. A printing apparatus comprising:
a display controller that causes a display unit to execute displaying; and
a printing unit that executes printing based on a print job, wherein
when a plurality of copies are to be printed based on a single print job, the display controller causes the display unit to display, to a user, a first screen including an image to be printed and a first information before completion of the printing of a first copy and causes the display unit to display, to a user, a second screen that includes a second information and an image to be printed and smaller than the image to be printed and included in the first screen after the completion of the printing of the first copy and before completion of the printing of all of the copies, each of the first information and the second information indicates at least a part of information regarding the single print job and a state of the printing apparatus, and the second information is different from the first information, and
the display controller causes the display unit to display each of the first screen and the second screen in a process flow of printing the single print job.

10. A method for producing printed objects of a plurality of copies, comprising:
displaying, to a user, a first screen including an image to be printed and a first information before completion of printing of a first copy;
producing a printed object of the first copy;
displaying, to a user, a second screen that does not include the image to be printed and includes a second information, or that includes the second information and an image to be printed and smaller than the image to be printed and included in the first screen after completion of the production of the printed object of the first copy and before completion of production of printed objects of all of the copies; and
producing printed objects of second and subsequent copies, wherein
each of the first information and the second information indicates at least a part of information regarding a single print job and a state of the printing apparatus, and the second information is different from the first information, and
the displaying of each of the first and second screens is performed in a process flow of printing the single print job.

* * * * *